United States Patent [19]
Anderson

[11] 3,828,900
[45] Aug. 13, 1974

[54] OVERLOAD CUT-OUT MECHANISM FOR MINING MACHINE MECHANICAL HAULAGE MECHANISM

[75] Inventor: Forrest Symington Anderson, Carluke, Scotland

[73] Assignee: Anderson Mavor Limited, Mothewell, Lanarkshire, Scotland

[22] Filed: May 30, 1973

[21] Appl. No.: 365,131

[30] Foreign Application Priority Data
May 31, 1972 Great Britain............... 25464/72

[52] U.S. Cl.............. 192/12 A, 192/4 R, 192/17 A, 192/18 A, 192/150 R
[51] Int. Cl....................... F16d 67/02, F16d 13/22
[58] Field of Search...... 192/12 A, 56 F, 144, 18 A, 192/4 R, 17 A, 150 R, 56 R; 74/78 R

[56] References Cited
UNITED STATES PATENTS

| | | | |
|---|---|---|---|
| 2,590,172 | 3/1952 | Guier et al.............. | 192/12 A X |
| 2,648,415 | 8/1953 | Neighbour et al......... | 192/17 R |
| 3,103,838 | 9/1963 | Beacom et al............ | 192/18 A X |
| 3,684,067 | 8/1972 | Anderson.................. | 192/18 A X |

*Primary Examiner*—Samuel Scott
*Assistant Examiner*—Lance W. Chandler
*Attorney, Agent, or Firm*—Larson, Taylor and Hinds

[57] ABSTRACT

The invention relates to overload cut-out mechanism for mineral mining machine haulage mechanism in which a torque reaction trip-out device is associated with an epicyclic gear interposed in the gear train of the haulage mechanism between the output from a forward and reverse gear selector and a constant ratio reduction gear train driving a haulage chain sprocket or the like. The torque reaction trip-out device includes a torque anchor arm connected to the sun wheel of the epicyclic gear and according to the load transmitted the torque arm is deflected and arranged to give unidirectional movement to a second arm to which is attached an adjustable rod which trips a latch member to release a friction type clutch in the gear transmission upstream of the epicyclic gear.

3 Claims, 3 Drawing Figures

OVERLOAD CUT-OUT MECHANISM FOR MINING MACHINE MECHANICAL HAULAGE MECHANISM

This invention relates to overload cut-out mechanism for mining machine mechanical haulage mechanism.

More specifically the invention provides for overload cut-out mechanism suitable for high powered haulage mechanism for mining machines.

In mechanical high powered haulage mechanism for mining machines of 30 horsepower and upward, difficulty has been found in providing a satisfactory overload cutout mechanism using friction clutches as these normally used slip until cut-off by an operator and while slipping damage can be caused to the clutch.

An object of the present invention is to provide mechanical haulage mechanism for mining machines with overload cut-out mechanism which overcomes the above disadvantage and which includes a torque device which reacts to the transmitted load to disconnect the driving member of the mechanism from the driven member and apply a brake to the driven member.

According to the invention in mineral mining machine mechanical hauling mechanism having a driving clutch operatively connectible through forward and reverse gear speed selection mechanism and an epicyclic gear and reduction gear train with a haulage chain driving sprocket or the like, an overload cut-out mechanism comprising a torque anchor arm connected at one end to the sun wheel of the epicyclic gear and anchored at its free end by spring means to prevent rotation of the sun wheel, a follower arm pivotally anchored at one end and operatively connected adjacent its opposite free end with the toque anchor arm, an axially adjustable rod mounted on the free end of the follower arm and engageable with a latched lever member to unlatch the lower member to actuate brake mechanism on the haulage gear train downstream of the epicyclic gear and to disengage the gear train upstream of the epicyclic gear.

A preferred embodiment of the invention is illustrated by way of example in the accompanying drawings in which.

Figure 1:
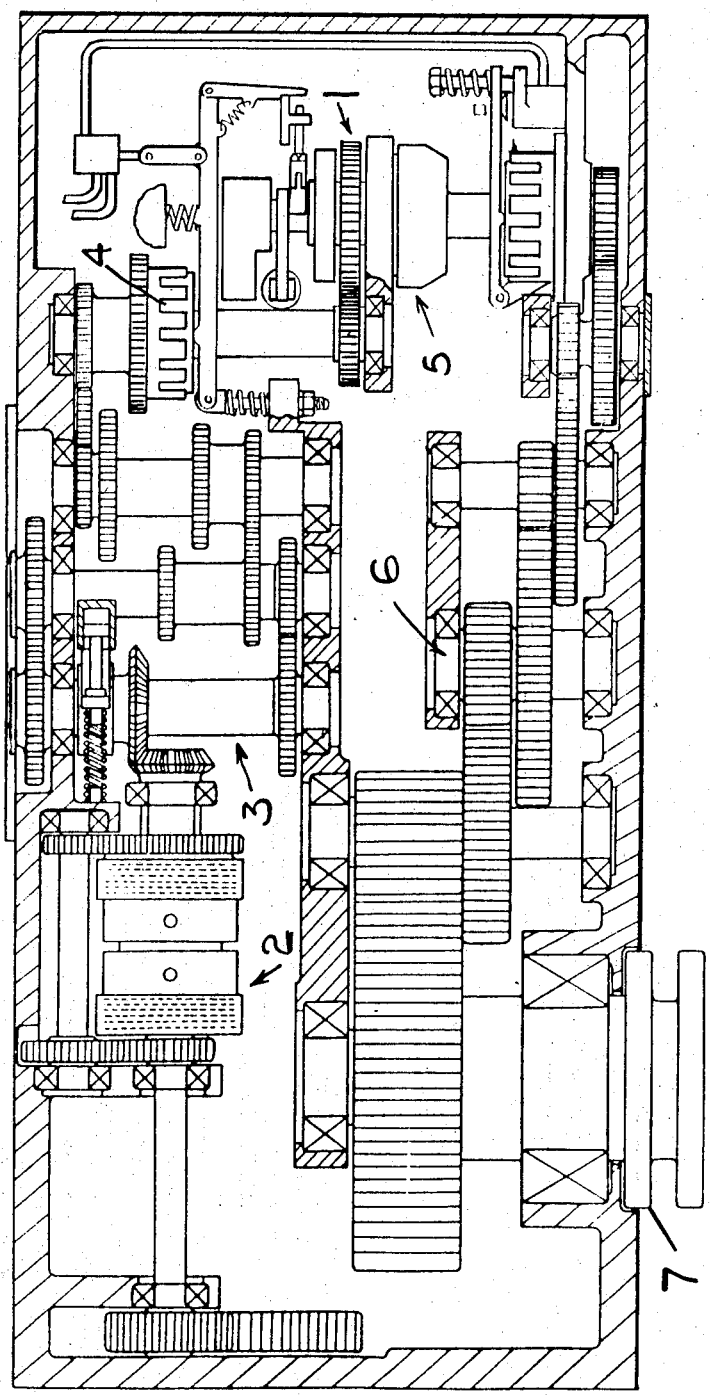
FIG. 1 is a schematic illustration of the layout of mineral mining machine haulage mechanism incorporating overload cut-out mechanism according to the invention.
Figure 2:
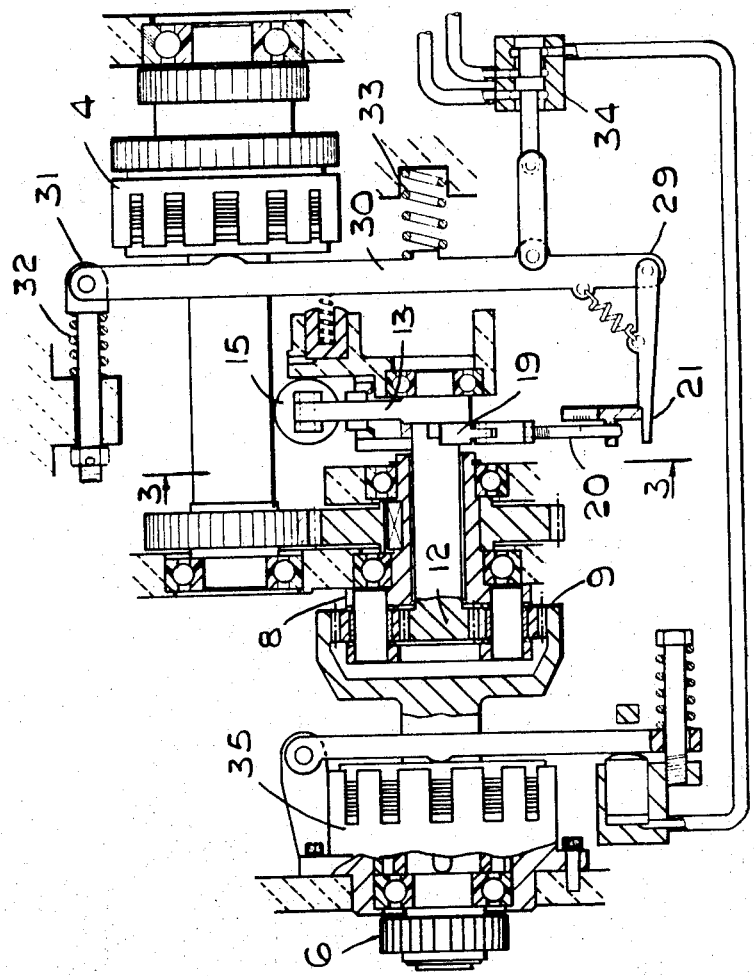
FIG. 2 illustrates the cut-out mechanism of FIG. 1 partly in section.
Figure 3:
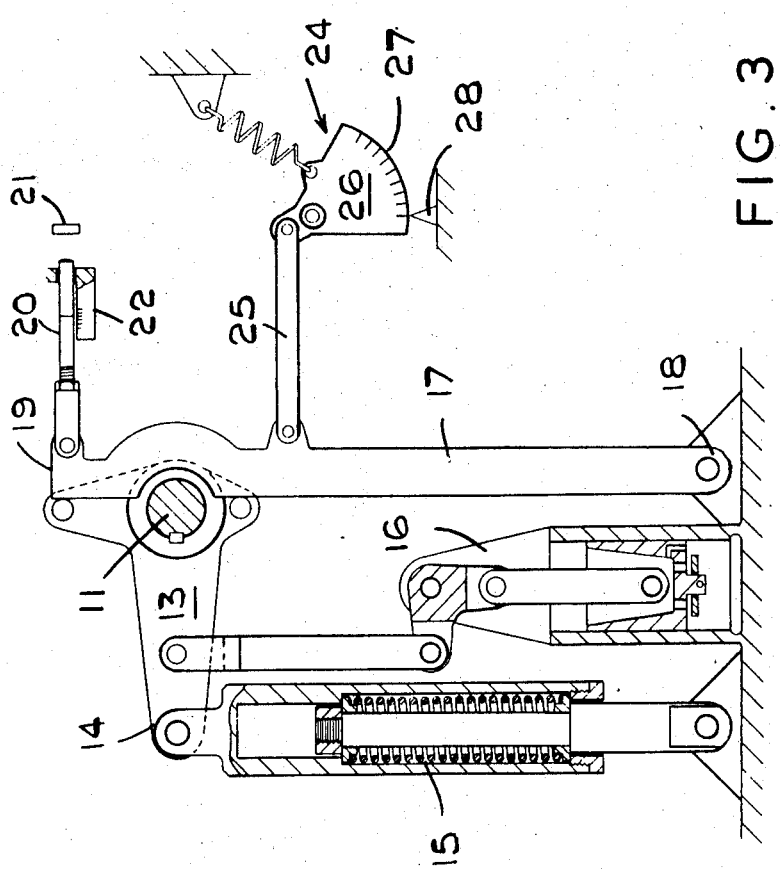
FIG. 3 is a view on the line 3—3 of FIG. 2 showing part of the cut-out mechanism in more detail.

Referring to FIG. 1 of the drawings overload cut-out mechanism denoted generally at 1 is interposed in mechanical haulage mechanism of known construction for a mineral mining machine.

The mechanical haulage mechanism comprises a two speed hydraulically operated friction driving clutch 2, having hydraulically operated control means and adapted to be driven by a power source, such as an electric motor (not shown).

The driving clutch 2 is operatively connectible to a three speed gearbox, denoted generally at 3 for selecting a predetermined gear ratio in forward or reverse direction.

The mechanical output from the gearbox 3 is adapted to be connectible through a friction clutch 4 and an epicyclic gear 5 with a constant ratio reduction gear train 6, which drives a haulage chain driving sprocket or the like 7.

The cage 8 of the epicyclic gear is operatively connected through the clutch 4 with the mechanical output from the three speed gearbox 3 and the annular gear 9 of the epicyclic gear is connected to the constant ratio reduction gear train 6. A shaft 11 of the sun wheel 12 of the epicyclic gear is connected to one end of a torque anchor arm 13 which is anchored at its opposite end 14 by spring means 15 to prevent rotation of the sun wheel.

The spring means 15 is provided with damper means in the form of a dash-pot 16 to dampen any oscillations of the spring means when released from load.

The torque reaction of the sun wheel 12 deflects the anchor arm 13 proportional to the torque in either direction depending on whether the mechanism is in forward or reverse gear and according to the load transmitted.

The two way movement of the torque anchor arm 13 is arranged to provide uni-directional movement to a follower arm 17.

The follower arm 17 is pivotally anchored at one end 18 and operatively connected adjacent its opposite end 19 with the torque anchor arm 13.

An axially adjustable rod 20 is pivotally mounted on the end 19 of the follower arm 17 and is engageable with a spring biased latch member 21.

The axially adjustable rod 20 is provided with calibrations 22. The adjusted length of the rod 20 determines the torque reaction required to trip the latch member 21 so that by adjusting the length of the rod 20 the latch member 21 may be tripped at a predetermined torque.

As the movement of the follower arm 17 is relative to the torque transmitted through the epicyclic gear an indication of the torque can be obtained by an indicator device denoted generally at 24 connected to the follower arm 17.

The indicator device 24 is provided by a link member 25 connected to the follower arm 17 intermediate its ends to move a quadrant 26 pivotally mounted at the end of the link member 25. The quadrant 26 is provided with suitable calibrations 27 and a fixed pointer 28 associated with the calibrations indicates the torque.

The latch member 21 is pivotally mounted to one end 29 of a lever 30 the other end 31 of the lever being pivotally anchored by spring bias means 32. The lever 30 is engageable to actuate the frictions clutch 4 interposed between the output of the three speed gear box 3 and the cage of the epicyclic gear.

The spring bias means 32 is operative to bias the lever 30 in a direction so that the clutch 4 is engaged when the latch member 21 is latched and spring bias means 33 biases the lever 30 in the opposite direction to disengage the clutch 4 when the latch member 21 is unlatched.

The lever 30 is operatively connected to valve means 34 in a hydraulic circuit which is actuated to apply brake means 35 to the mechanical gear train downstream of the epicyclic gear.

The valve means 34 also actuates a hydraulic circuit to disengage the driving clutch 2.

The friction clutch 4 may be omitted.

The indicator device 20 may alternatively be provided by a movable pointer and fixed calibrations.

What is claimed is:

1. An overload cut-out mechanism in a mineral mining machine mechanical haulage mechanism having a driving clutch operatively connectible through forward and reverse gear speed selection mechanism and an epicyclic gear and reduction gear train with haulage chain driving means said overload cut-out mechanism comprising a torque anchor arm connected at one end to the sun wheel of said epicyclic gear and anchored at its free end by spring means to prevent rotation of said sun wheel, a follower arm pivotally anchored at one end and operatively connected adjacent its opposite free end with said toque anchor arm, an axially adjustable rod mounted on the free end of said follower arm and engageable with a latch member to unlatch the latch member and actuate brake mechanism on the haulage gear train downstream of said epicyclic gear and to disengage the gear train upstream of said epicyclic gear.

2. An overload cut-out mechanism as claimed in claim 1, whereby said spring means is provided with a dash-pot to damp oscillations of the spring means when released from load.

3. An overload cut-out mechanism as claimed in claim 1, including a friction clutch interposed between said gear speed selection mechanism and said epicyclic gear, and said latch member adapted to actuate said friction clutch to disengage said gear train upstream of said epicyclic gear and to actuate valve means in a hydraulic circuit to disengage the driving clutch.

* * * * *